United States Patent
Kulkarni et al.

(10) Patent No.: US 11,907,687 B2
(45) Date of Patent: Feb. 20, 2024

(54) RE-USABLE INTEGRATION COMPONENT CONFIGURATION IN A MICROSERVICE BASED INTEGRATION SERVICE

(71) Applicant: SAP SE, Walldorl (DE)

(72) Inventors: Gopalkrishna Kulkarni, Bangalore (IN); Mrutyunjay Padmasali Sidda, Bangalore (IN)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 17/457,492

(22) Filed: Dec. 3, 2021

(65) Prior Publication Data
US 2023/0176836 A1     Jun. 8, 2023

(51) Int. Cl.
| | | |
|---|---|---|
| *G06F 9/50* | (2006.01) | |
| *G06F 8/61* | (2018.01) | |
| *G06F 8/36* | (2018.01) | |
| *G06F 8/38* | (2018.01) | |
| *G06F 8/71* | (2018.01) | |
| *G06F 8/60* | (2018.01) | |

(52) U.S. Cl.
CPC ............... *G06F 8/36* (2013.01); *G06F 8/38* (2013.01); *G06F 8/60* (2013.01); *G06F 8/71* (2013.01)

(58) Field of Classification Search
CPC ..... G06F 8/36; G06F 8/38; G06F 8/71; G06F 8/60
See application file for complete search history.

(56) References Cited

U.S. PATENT DOCUMENTS

| | | | |
|---|---|---|---|
| 11,606,359 B1* | 3/2023 | Virtser | H04L 63/123 |
| 2017/0024717 A1* | 1/2017 | Istrati | G06Q 30/0641 |
| 2018/0039494 A1* | 2/2018 | Lander | H04L 45/02 |
| 2018/0248772 A1* | 8/2018 | Orsini | H04L 67/75 |
| 2019/0102157 A1* | 4/2019 | Caldato | G06F 21/602 |

(Continued)

OTHER PUBLICATIONS

Leonardo P. Tizzei et al., Using Microservices and Software Product Line Engineering to Support Reuse of Evolving Multi-tenant SaaS, 2017, [Retrieved on Nov. 3, 2023]. Retrieved from the internet: <URL: https://dl.acm.org/doi/pdf/10.1145/3106195.3106224> 10 Pages (205-214) (Year: 2017).*

(Continued)

*Primary Examiner* — Anibal Rivera
(74) *Attorney, Agent, or Firm* — Buckley, Maschoff & Talwalkar LLC

(57) ABSTRACT

According to some embodiments, methods and systems may be associated with a cloud computing environment having an integration service (e.g., associated with a Software-as-a-Service or a Platform-as-a-Service). A design microservice may have a User Interface ("UI") framework and UI components for a first integration developer. A configuration framework may determine a set of configuration values for an integration component of an integration scenario defined by the first integration developer. The configuration framework may then receive, from the first integration developer, a publication indication associated with the integration component. Responsive to the publication indication, the configuration framework may arrange for the set of configuration values for the integration component to be made available to a second integration developer (e.g., via a marketplace platform).

18 Claims, 15 Drawing Sheets

(56) References Cited

U.S. PATENT DOCUMENTS

2020/0249999 A1* 8/2020 Golway .................... G06F 9/48
2022/0327006 A1* 10/2022 Makhija ................. G06N 20/00

OTHER PUBLICATIONS

Hui Song et al., Deep Customization of Multi-Tenant SaaS Using Intrusive, 2018, [Retrieved on Nov. 3, 2023]. Retrieved from the internet: <URL: https://dl.acm.org/doi/pdf/10.1145/3183399.3183407> 4 Pages (97-100) (Year: 2018).*

* cited by examiner

| INTEGRATION COMPONENT IDENTIFIER 1302 | TENANT IDENTIFIER 1304 | CONFIGURATION VALUES 1306 | PRICE 1308 | STATUS 1310 |
|---|---|---|---|---|
| IC_101 | T_101 | CV_1, CV_2, CV_3 | $W | SAVED |
| IC_102 | T_101 | CV_1, CV_4, CV_5 | $X | PUBLISHED |
| IC_103 | T_104 | CV_A, CV_B, CV_C | $Y | SOLD TO T_101 |
| IC_104 | T_104 | CV_6, CV_7, CV_8 | $Z | PUBLISHED |

RE-USABLE INTEGRATION COMPONENT CONFIGURATION IN A MICROSERVICE BASED INTEGRATION SERVICE

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support the exchange of information between multiple applications via messages. For example, FIG. 1A is a high-level block diagram associated with a cloud-based computing system 100. The system may use messages to exchange information between applications, such as an AMAZON® AWS filestore 110, SUCCESSFACTORS® 120, GOOGLE® drive 130, SALESFORCE® 140, etc. In this case, the messages from one application may need to be re-formatted, validated, and/or otherwise processed (e.g., converting dollars into euros) by a middle layer integration service 150 before being sent to another application. In a Graphical User Interface ("GUI") based multi-tenant integration service 150, such as SAP® Cloud Platform Integration ("CPI"), an integration developer can drag-and-drop integration components to create integration scenarios.

The integration service 150 is a widely used middleware component that helps connect various (heterogenous) systems in a unified way and apply many enterprise integration patterns. Typically, an integration developer creates one (or many) integration scenarios that each contain many integration components. For example, FIG. 1B illustrates a system 101 associated with an integration service wherein an integration developer 111 accesses a UI/browser 121 to define integration scenarios 131 that are each composed of a set of integration components 141. Moreover, each of these components 141 may need to be configured by providing configuration values, such as authentication type, query, retry, time out, etc.

FIG. 2 is a more detailed example of a system 200 associated with an integration service 150. An integration developer 210 creates and/or manages an integration scenario (e.g., start timer 1, request reply 1, etc.) using a UI/browser 220 to communicate with a UI/design microservice of an integration service provider 230. The UI/design microservice of the integration service provider 230 may include, for example, a metadata framework 240 (e.g., with a metadata component registry 244, a metadata parser 246, and integration component metadata 242 based on adapters, flow steps, script steps, etc.) that exchanges information with an automatic UI component/framework 248.

Note that currently there is no way to share integration component configurations (e.g., between developers and/or tenants) so that they can be re-used. For example, connecting to a particular backend that has its own query language may require substantial configurations for that particular adapter, e.g., a big query string, page initiation configuration, retry configuration, security configuration, schedule (if available), etc. Each time a different developer wants to use that same backend, he or she must again key-in each of these configuration values. This, however, can be a time-consuming and error prone task—especially when there are a substantial number of integration components, scenarios, etc.

It would therefore be desirable to provide re-usable integration component configurations for an integration service in a cloud computing environment in a secure, automatic, and efficient manner.

SUMMARY

According to some embodiments, methods and systems may be associated with a cloud computing environment having an integration service (e.g., associated with a Software-as-a-Service or a Platform-as-a-Service). A design microservice may have a UI framework and UI components for a first integration developer. A configuration framework may determine a set of configuration values for an integration component of an integration scenario defined by the first integration developer. The configuration framework may then receive, from the first integration developer, a publication indication associated with the integration component. Responsive to the publication indication, the configuration framework may arrange for the set of configuration values for the integration component to be made available to a second integration developer (e.g., via a marketplace platform).

Some embodiments comprise: means for determining, by a computer processor of a configuration framework, a set of configuration values for an integration component of an integration scenario defined by a first integration developer via a design microservice having a UI framework and UI components; means for receiving, from the first integration developer, a publication indication associated with the integration component; and, responsive to the publication indication, means for arranging for the set of configuration values for the integration component to be made available to a second integration developer.

Some technical advantages of some embodiments disclosed herein are improved systems and methods to provide re-usable integration component configurations for an integration service in a cloud computing environment in a secure, automatic, and efficient manner.

BRIEF DESCRIPTION OF THE DRAWINGS

FIG. 13 is portion of a configuration framework data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a cloud computing landscape, stand-alone, individual applications may exchange information via an integration service. For example, in a GUI-based integration service (such as SAP® CPI), an integration developer drags-and-drops integration components. Moreover, according to some embodiments the integration developer may add custom logic via an integration component approach. In this approach, the developer may create his or her own integration component configurations "on the fly." In addition, custom flows steps may be shared and/or published (e.g., in a marketplace) to be consumed by other users.

Figure 1A:
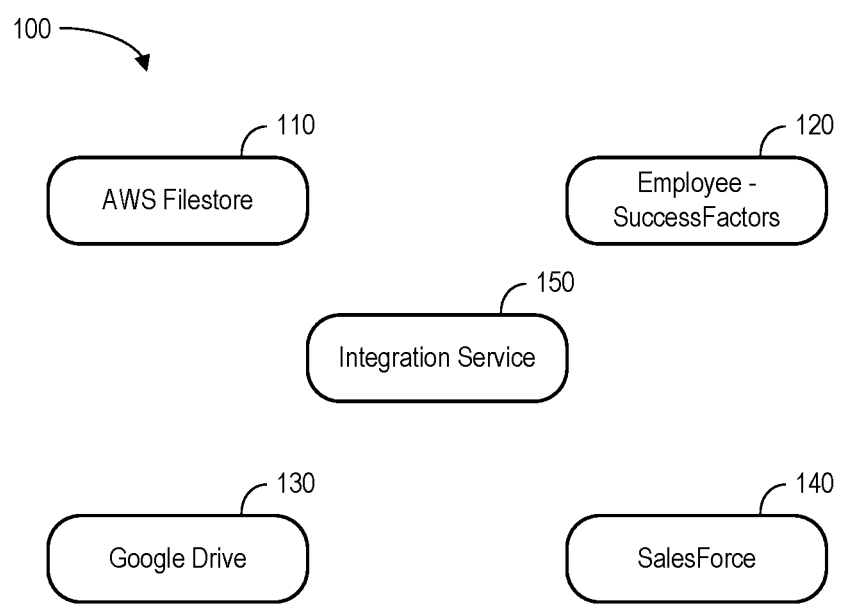
FIG. 1A is a high-level block diagram associated with a cloud-based computing system.
Figure 1B:
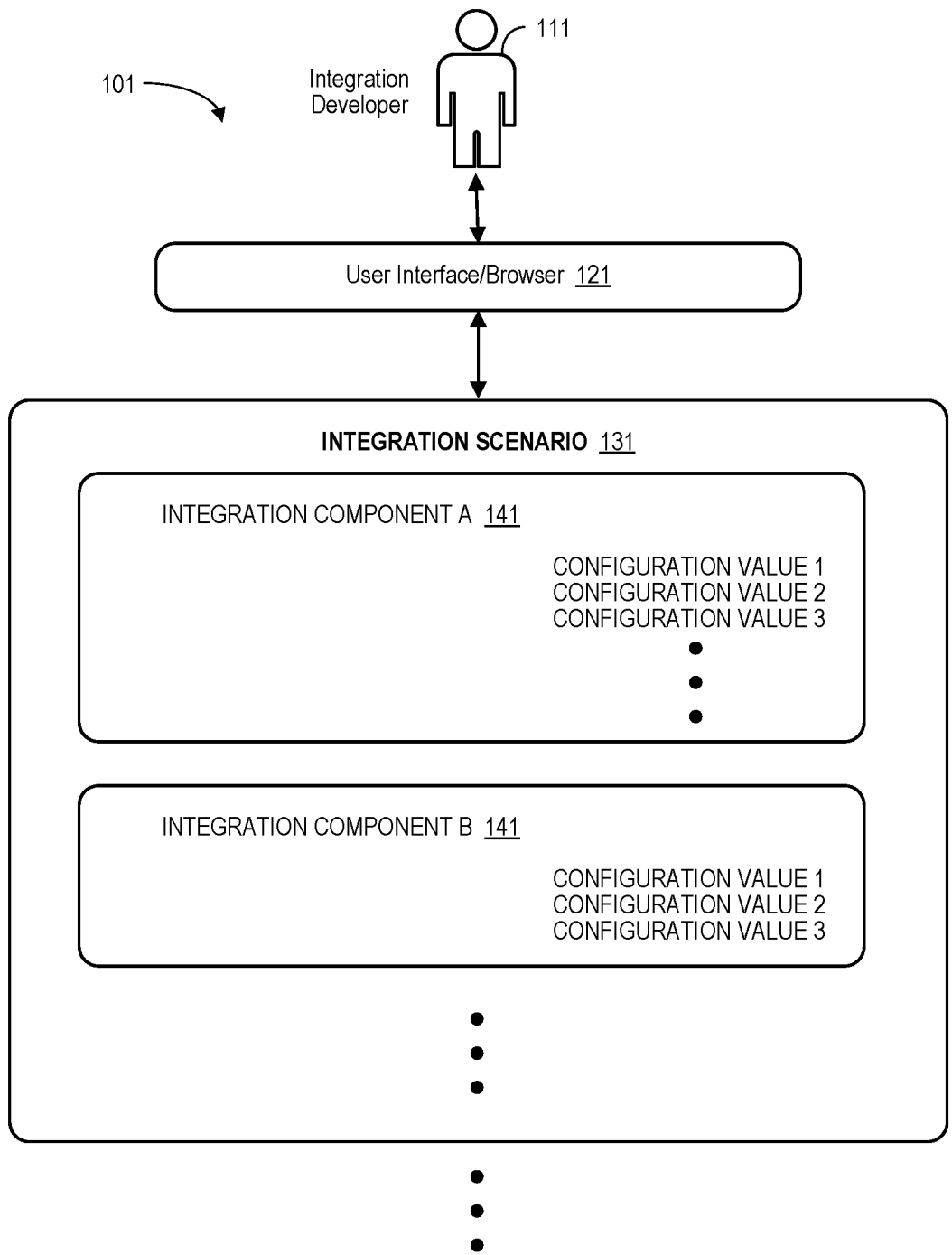
FIG. 1B illustrates a system associated with an integration service.
Figure 2:
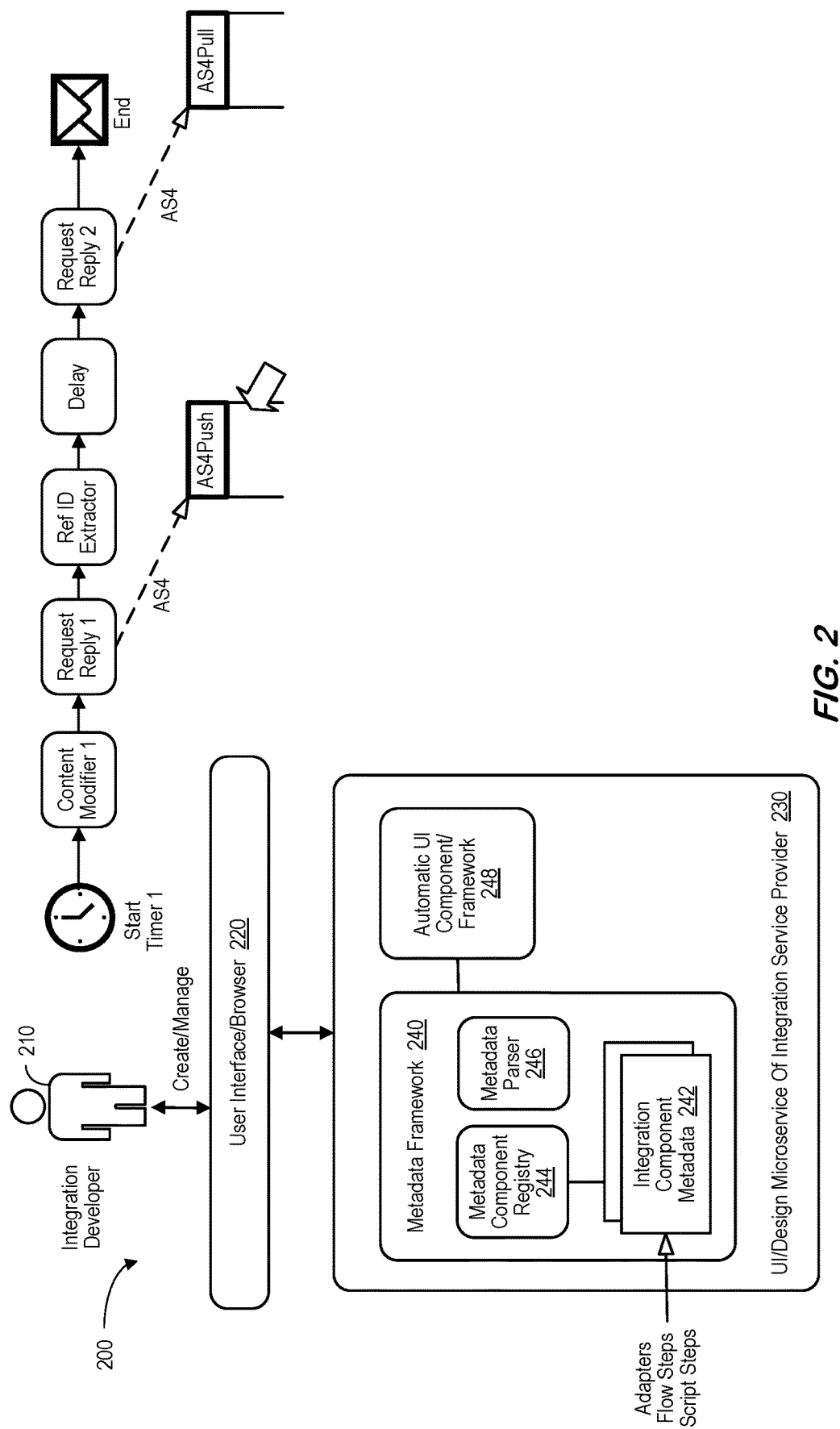
FIG. 2 is a more detailed example of a system associated with an integration service.
Figure 3:
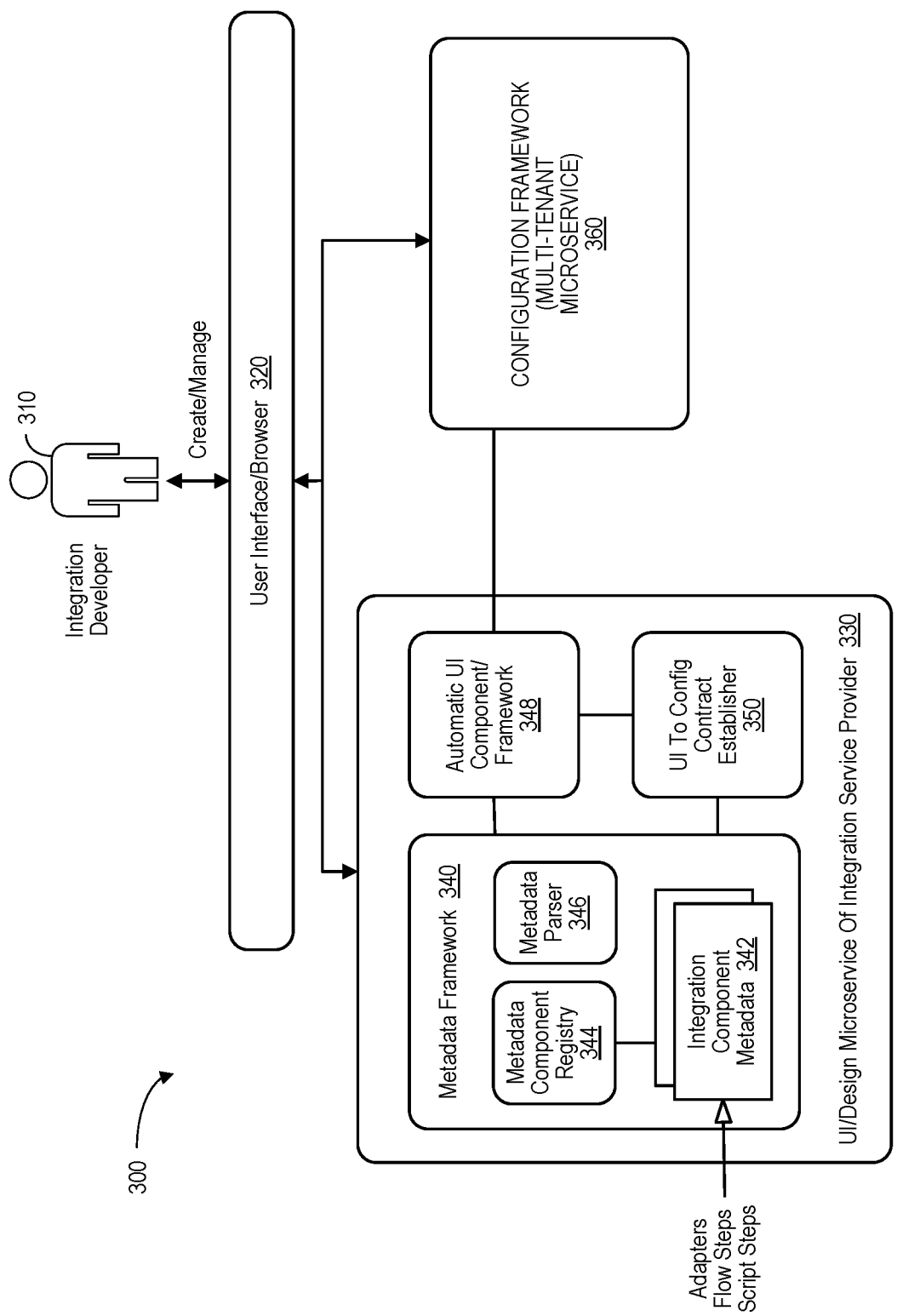
FIG. 3 is an integration service architecture according to some embodiments.

FIG. 3 is a high-level block diagram of one example of a system 300 that provides an integration service according to some embodiments. As with the system of FIG. 2, an integration developer 310 creates and/or manages an integration scenario (e.g., start timer 1, request reply 1, etc.) using a UI/browser 320 to communicate with a UI/design microservice of an integration service provider 330. The UI/design microservice of the integration service provider 330 may include, for example, a metadata framework 340 (e.g., with a metadata component registry 344, a metadata parser 346, and integration component metadata 342 based on adapters, flow steps, script steps, etc.) that exchanges information with an automatic UI component/framework 348.

According to this embodiment, the automatic UI component/framework 348 and metadata framework 340 also exchange information with a UI to configuration contract establisher 350. The UI to configuration contract establisher 350 may, in some embodiments, extract user configurations. According to some embodiments, the UI to configuration contract establisher 350 is a specific implementation for an integration service provider. It might be made generic at some level by offering an API. The main responsibility of this component is to understand the underlying integration Service UI/design to extract the user configurations. Note that it might not necessarily be deployed in an integration service provider (but it is one way of solving the problem).

Moreover, the automatic UI component/framework 348 communicates with a configuration framework (e.g., for a multi-tenant microservice) 360. Note that the integration developer 310 may access (e.g., via the UI/browser 320) both the UI/design microservice of an integration service provider 330 and the configuration framework 360. According to some embodiments, a remote operator or administrator device may be used to configure or otherwise adjust the system 300.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The configuration framework 360 may store information into and/or retrieve information from various data stores (e.g., component configuration values), which may be locally stored or reside remote from the configuration framework 360. Although a single configuration framework 360 is shown in FIG. 3, any number of such devices may be included. Moreover, various devices described herein might be combined according to embodiments of the present invention. For example, in some embodiments, the UI/design microservice of an integration service provider 330 and the configuration framework 360 might comprise a single apparatus. The system 300 functions may be performed by a constellation of networked apparatuses, such as in a distributed processing or cloud-based architecture.

An administrator may access the system 300 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device (e.g., to define how microservices interact) and/or provide or receive automatically generated recommendations or results associated with the system 300.

As used herein, the phrase "integration component" might refer to, for example, a way to meet the specific transformation needs that are not covered by built-in components (validators, converters, etc.). Target users may include an iFlow developer, a custom adapter developer, etc. The integration component may extend an Application Development Kit ("ADK") Software Development Kit ("SDK"), provide web-based development, and/or add a dedicated section (e.g., palette) in an iFlow developer.

Figure 4:
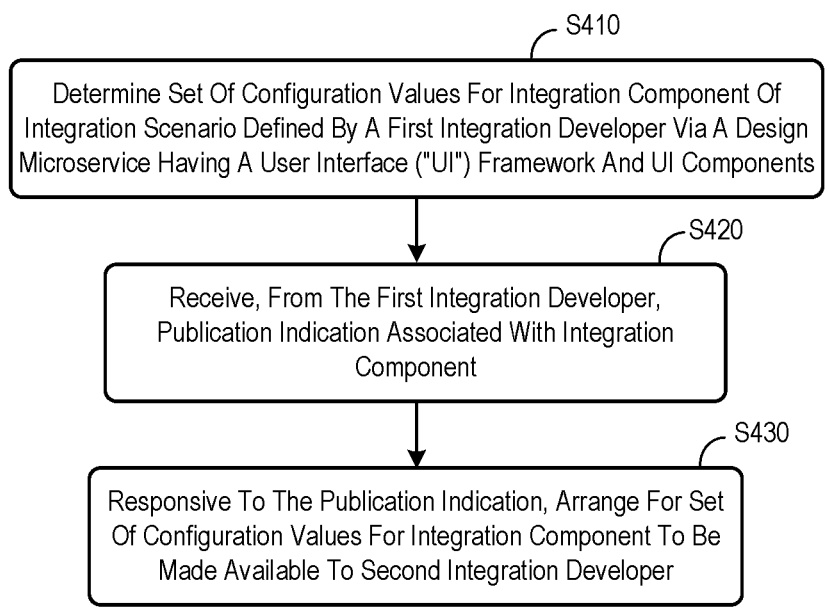
FIG. 4 is a method according to some embodiments.

FIG. 4 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a computer processor of a configuration framework may determine a set of configuration values for an integration component of an integration scenario (e.g., a Software-as-a-Service, a Platform-as-a-Service, etc.) defined by a first integration developer (e.g., associated with a first tenant) via a design microservice having a UI framework and UI components. The integration component might be associated with, for example, an adapter, a custom script, flow steps, a mapping step, etc. Moreover, at least one of the configuration values might be associated with an authentication type, a query, a retry configuration, a time-out, a big query string, a page initiation configuration, a security configuration, a schedule, etc.

At S420, the system may receive, from the first integration developer, a publication indication associated with the integration component. According to some embodiments, sets of configuration values for a plurality of integration components of the integration scenario are made available to another integration developer. Similarly, in some embodiments sets of configuration values for a plurality of integration scenarios are made available to another integration developer.

Responsive to the publication indication, the system may arrange for the set of configuration values for the integration component to be made available to a second integration developer (e.g., associated with a second tenant) at S430. The arranging for the set of configuration values for the integration component to be made available to the second integration developer might be associated with an open Application Programming Interface ("API") specification and/or JavaScript Object Notation ("JSON").

Figure 5:
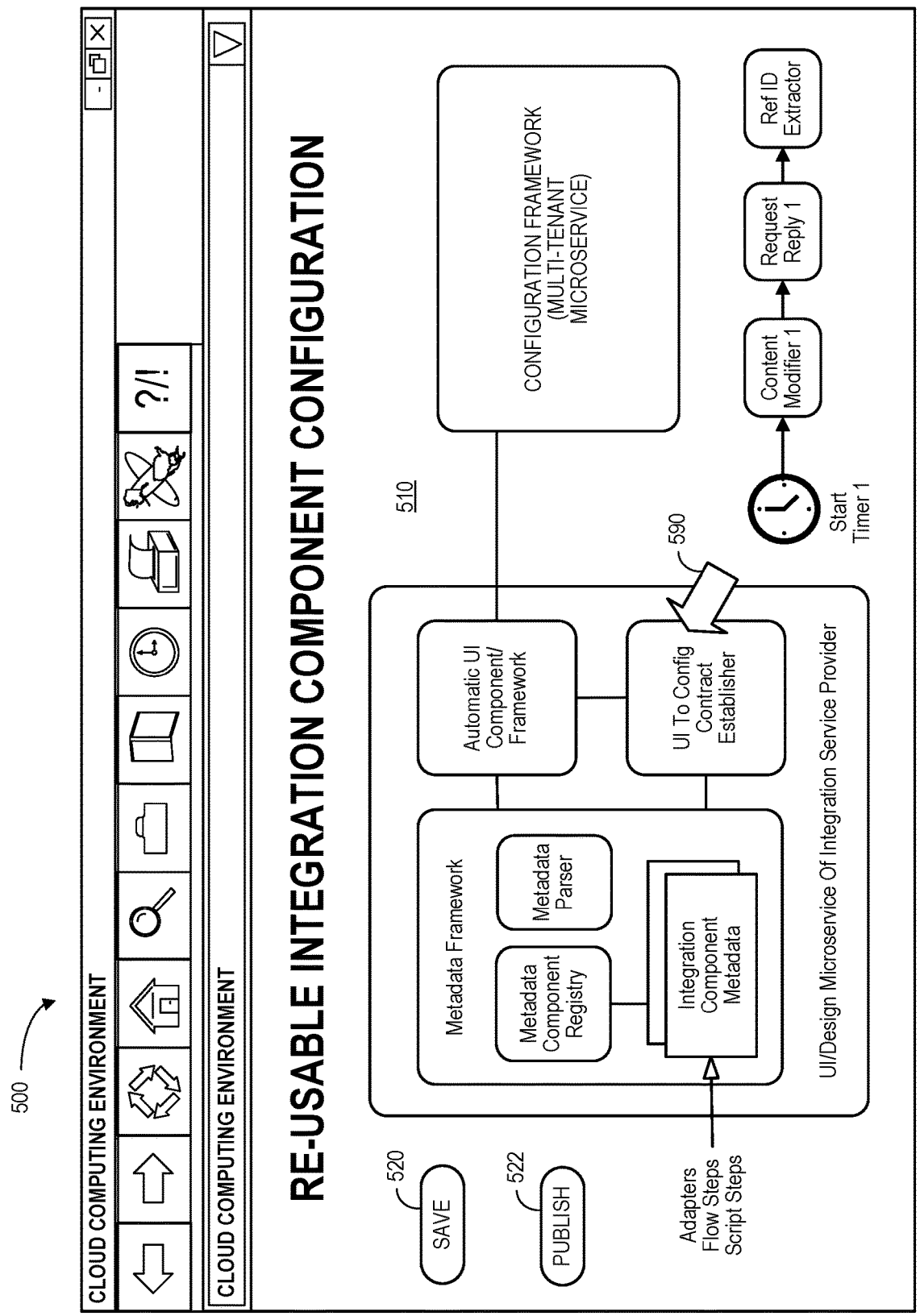
FIG. 5 is an integration component display according to some embodiments.

FIG. 5 is an integration component display 500 according to some embodiments. The display 500 includes a graphical representation 510 or dashboard that might be used to manage configuration framework (e.g., associated with a multi-tenant cloud computing environment). In particular, selection of an element (e.g., via a touchscreen or computer mouse pointer 590) might result in the display of a popup window that contains configuration data. The display 500 may also include a user selectable "Save" icon 520 to store component configurations and/or scenarios and a "Publish" icon 522 to make those items available (e.g., to other tenants via a marketplace).

Figure 6:
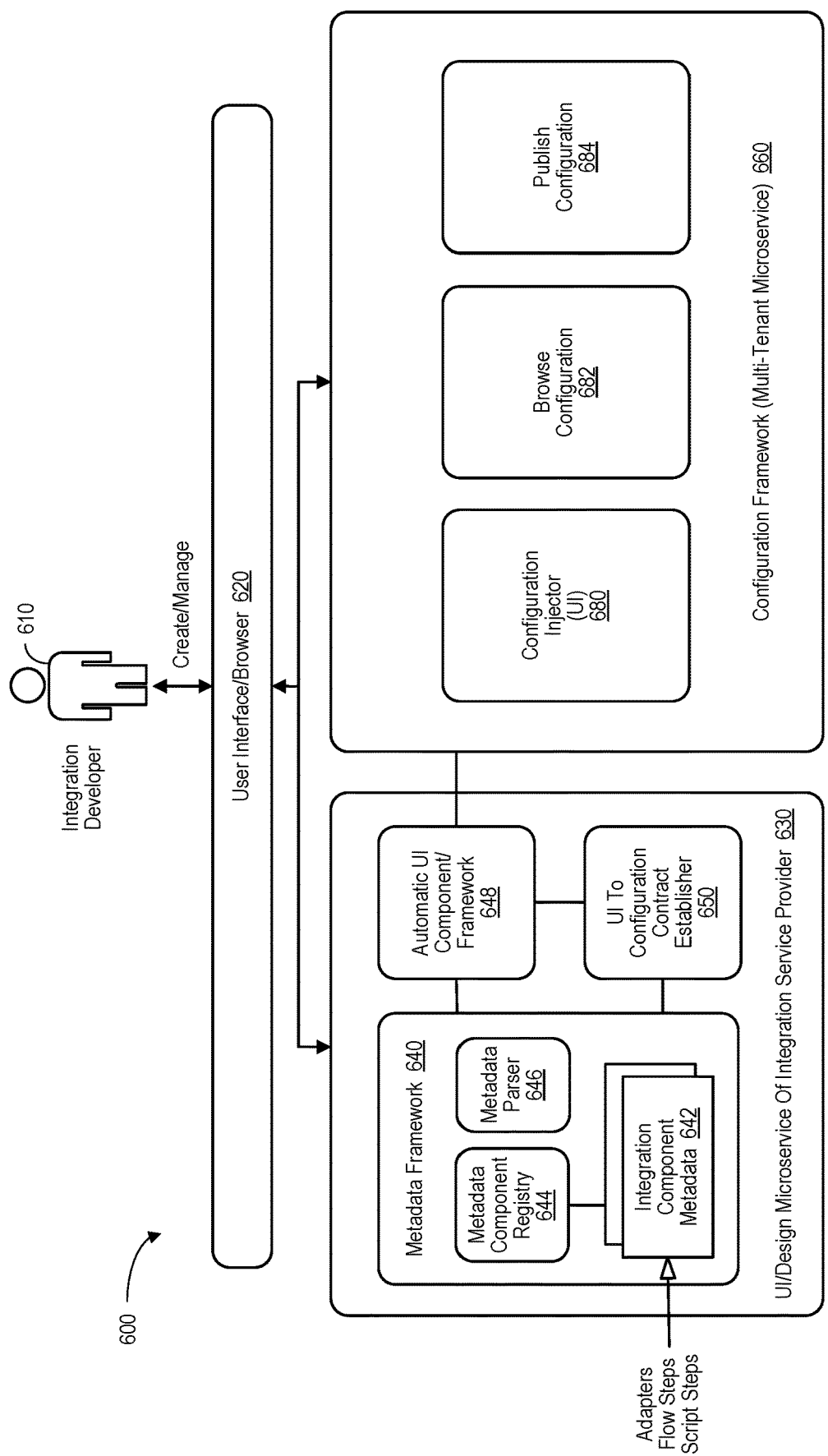
FIG. 6 is a more detailed integration service architecture in accordance with some embodiments.

In some embodiments, a configuration injector may match an appropriate configuration for an integration component. For example, FIG. 6 is a more detailed integration service architecture 600 in accordance with some embodiments. As before, an integration developer 610 creates and/or manages an integration scenario using a UT/browser 620 to communicate with a UI/design microservice of an integration service provider 630. The UI/design microservice of the integration service provider 630 may include, for example, a metadata framework 640 (e.g., with a metadata component registry 644, a metadata parser 646, and integration component metadata 642 that is based on adapters, flow steps, script steps, etc.) that exchanges information with an automatic UI component/framework 648.

The automatic UI component/framework 648 and metadata framework 640 also exchange information with a UI to configuration contract establisher 650. The UI to configuration contract establisher 650 may, in some embodiments, extract user configurations. Moreover, the automatic UI component/framework 648 communicates with a configuration framework (e.g., for a multi-tenant microservice) 660. According to this embodiment, a configuration injector 680 in the configuration framework 660 may match appropriate configurations for a component. For example, for a component XML validator there might be many matching configurations. The relevant configuration will be retrieved by the configuration injector 680. A browse configuration component 682 and a publish configuration component 684 in the configuration framework 660 may make the integration component available via a marketplace platform. That is, these components 682, 684 may help other users discover available configurations for a component and/or an integration scenario.

Thus, some embodiments may provide a method and software framework that lets integration service level and component level configurations be re-usable. For example, a developer can configure all of the required fields for an adapter such as query, retry configuration, security type, and data format (if available) and then test and publish this configuration in an open API specification (such as JSON). Embodiments may also facilitate the lifecycle management of these configurations using the described software framework.

Note that an integration service may be based on a GUI (however, embodiments may be extended to non-GUI based solutions as well). Usually, there will be a UI/design service (microservice) that has metadata for an integration component (e.g., adapter, flow step, script step, mapping step, etc.). The metadata framework 640 offers parsing of the metadata which helps UI framework render the UI for the user to provide the configuration data. The UI to configuration contract establisher 650 understands the underlying metadata and UI framework. For each component/integration scenario usage, it creates component configuration/iFlow configuration in a dedicated microservice. The developer 610 is given the option to save the configuration or publish for other users. When publishing, the developer can provide versioning and semantic metadata (e.g., backend name, availability, cost, etc.). The developer can manage these configurations for changes and publish changed information (which might result in a marketplace alert). Responsive to the change, users can consume the new configuration.

Figure 7:
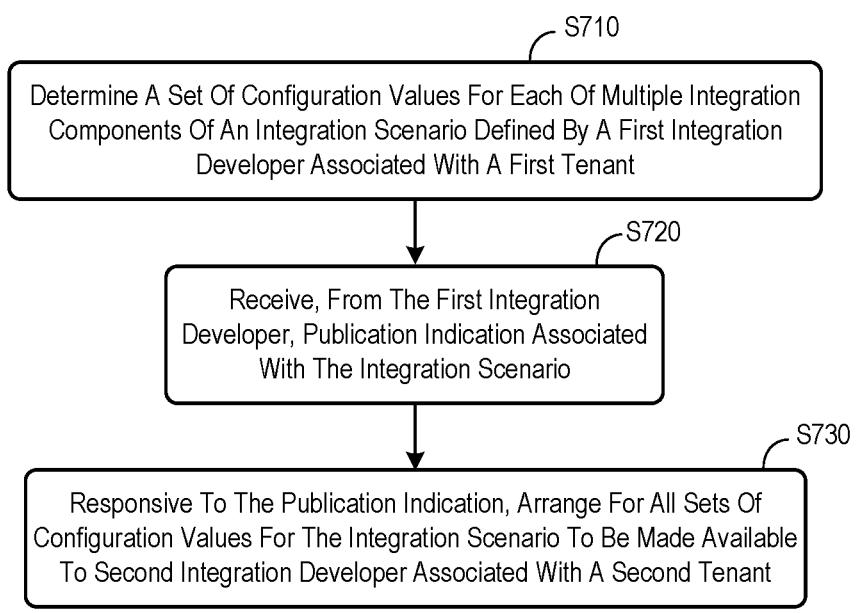
FIG. 7 is an integration scenario method according to some embodiments.

FIG. 7 is an integration scenario method according to some embodiments. At S710, the system determines a set of configuration values for each of multiple integration components of an integration service. This may be performed, for example, by a first integration developer associated with a first tenant. At S720, the system may receive, from the first integration developer, a publication indication associated with the entire integration scenario (instead of a single component. Responsive to the publication indication, at S730 the system may arrange for all sets of configuration values for that integration scenario to be made available to a second integration developer (e.g., associated with a second tenant) via a marketplace.

Figure 8:
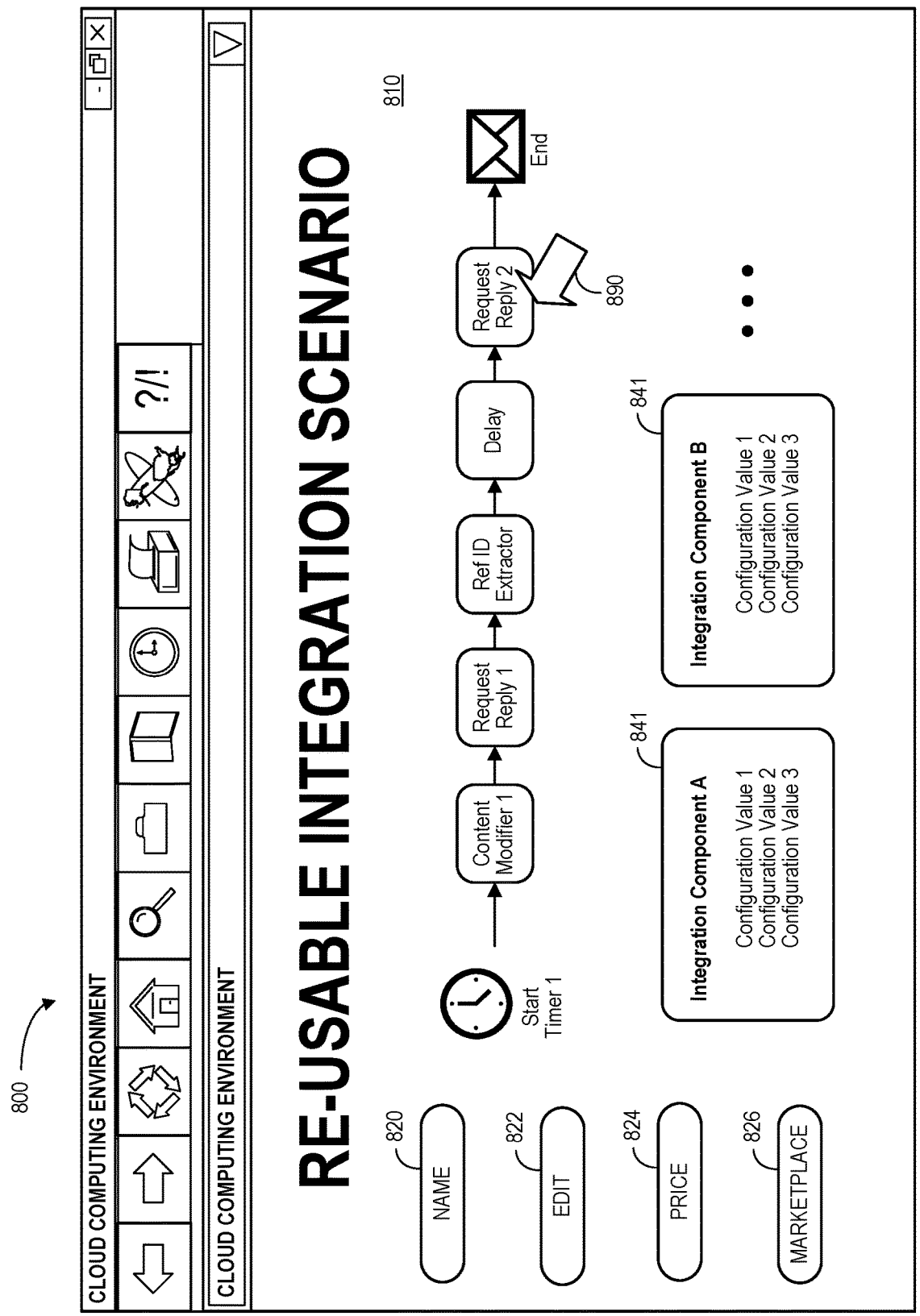
FIG. 8 is an integration scenario display in accordance with some embodiments.

FIG. 8 is an integration scenario display 800 in accordance with some embodiments. An integration developer may use the display 800 to create an integration scenario 810 (e.g., via GUI drag and drop actions using a computer mouse 890). The integration scenario 810 includes multiple integration components 841 (e.g., integration component A, integration component B, etc.) each of which can have a set of configuration values. The developer can also select: a "Name" icon 820 to assign a name to the scenario; an "Edit" icon 822 to change the scenario, components, etc.; a "Price" icon 824 to establish a cost to purchase the scenario; and a "Marketplace" icon 826 to publish the scenario for re-use by other developers.

Figure 9:
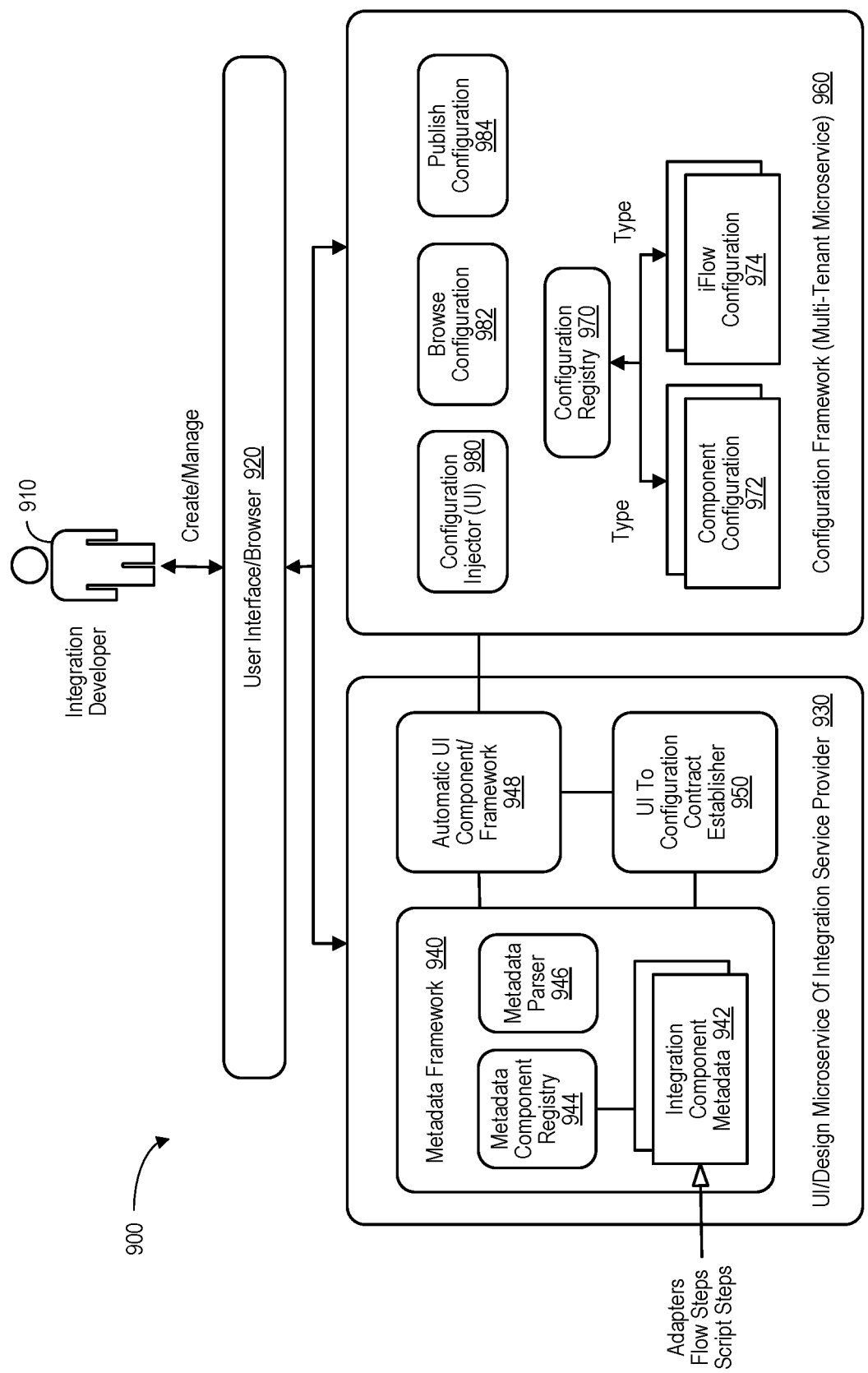
FIG. 9 is an even more detailed integration service architecture according to some embodiments.

According to some embodiments, a configuration registry may be associated with types for a component configuration and/or an iFlow configuration. For example, FIG. 9 is an even more detailed integration service architecture 900 according to some embodiments. As before, an integration developer 910 creates and/or manages an integration scenario using a UI/browser 920 to communicate with a UI/design microservice of an integration service provider 930. The UI/design microservice of the integration service provider 930 may include, for example, a metadata framework 940 (e.g., with a metadata component registry 944, a metadata parser 946, and integration component metadata 942 based on adapters, flow steps, script steps, etc.) that exchanges information with an automatic UI component/framework 948.

The automatic UI component/framework 948 and metadata framework 940 also exchange information with a UI to configuration contract establisher 950. The UI to configuration contract establisher 950 may, in some embodiments, extract user configurations. Moreover, the automatic UI component/framework 948 communicates with a configuration framework (e.g., for a multi-tenant microservice) 960. A configuration injector 980 in the configuration framework 960 may match appropriate configurations for a component. A browse configuration component 982 and a publish configuration component 984 in the configuration framework 960 may make the integration component available via a marketplace platform. According to this embodiment, a configuration registry 970 may be associated with types for component configurations 972 and iFlow configurations 974. The configuration registry 970 may, for example, hold a mapping of integration components to the relevant configuration. The unique identifier for a component may be provided by the UI to configuration contract establisher 950.

Figure 10:
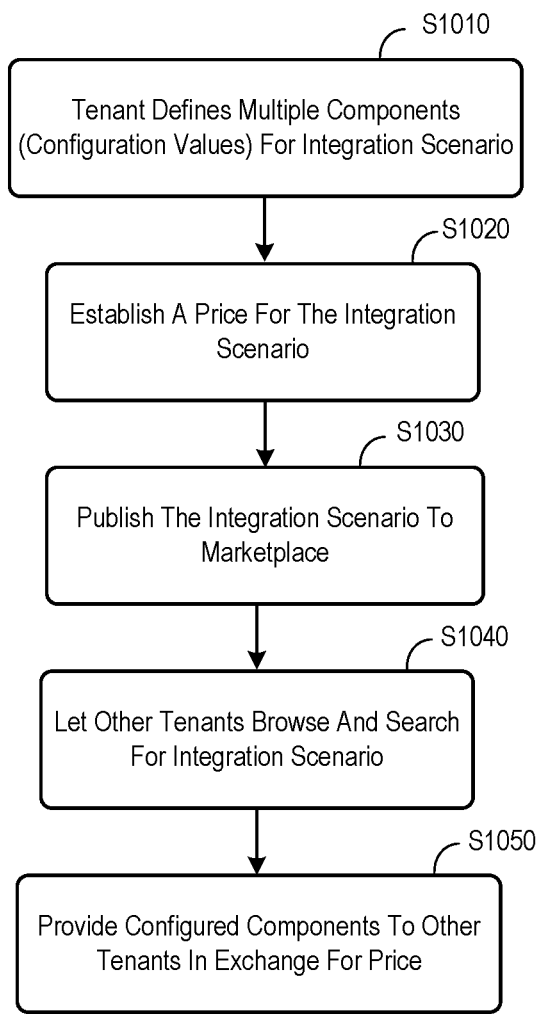
FIG. 10 is a lifecycle method in accordance with some embodiments.

FIG. 10 is a lifecycle method in accordance with some embodiments. At S1010 a tenant may define multiple integration components (that is, define configuration values for those components) of an integration scenario. At S1020, the tenant may establish a price or cost for the integration scenario to be used by others (e.g., not that the cost might be zero, be based on reciprocity, etc.). At S1030, the tenant may publish the integration scenario (or a single component) to a marketplace. At S1040, the marketplace may let other tenants browse and search a data store looking for an integration component, scenario, capability, etc. At S1050, the marketplace may provide the configured components to other user or tenants in exchange for payment of the specified price.

Figure 11:
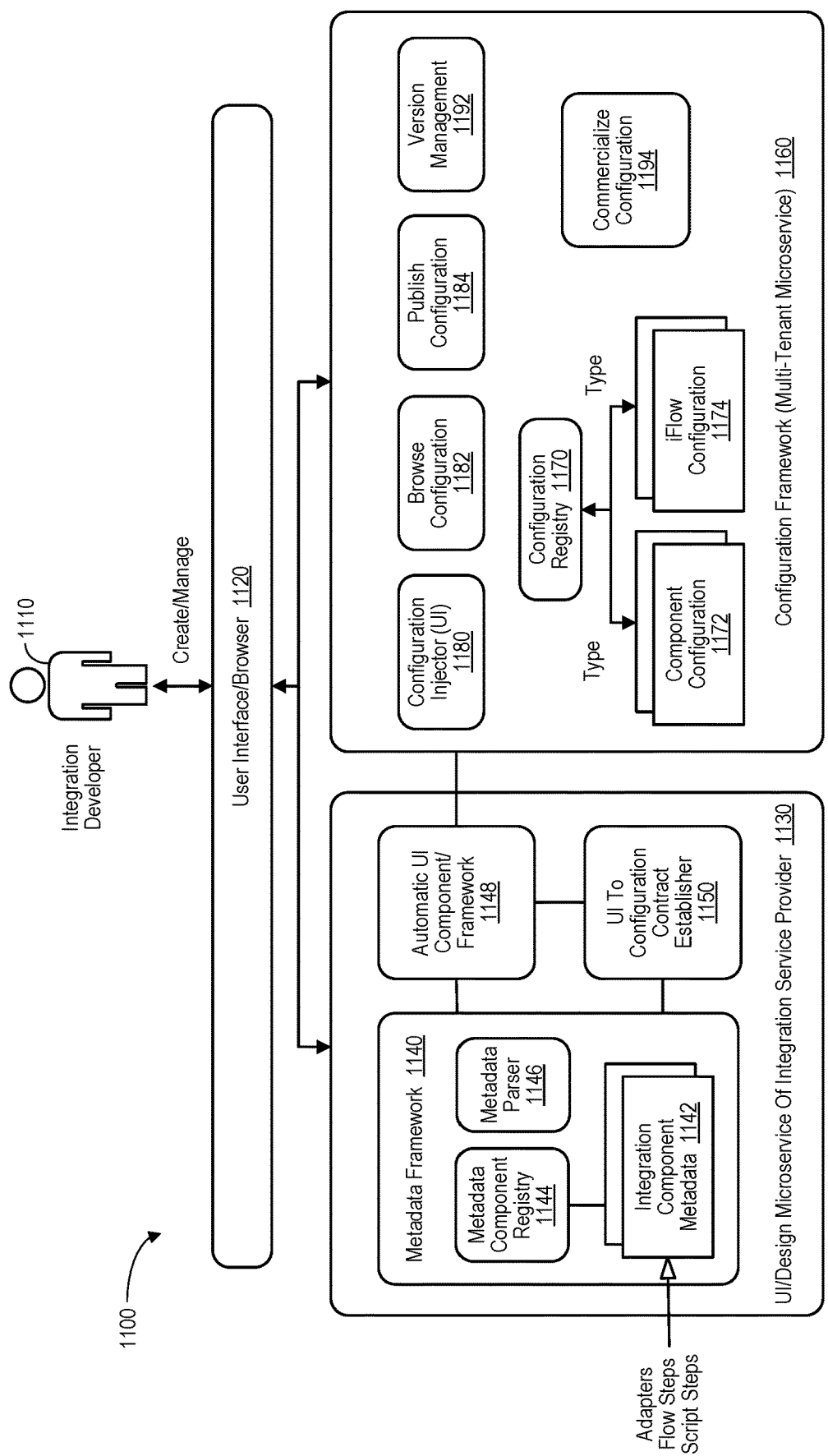
FIG. 11 is a still more detailed integration service architecture according to some embodiments.

According to some embodiments, a version management component and a commercialization component provide for lifecycle management and commercialization of the integration component. For example, FIG. 11 is a still more detailed integration service architecture 1100 according to some embodiments. As before, an integration developer 1110 creates and/or manages an integration scenario using a UI/browser 1120 to communicate with a UI/design microservice of an integration service provider 1130. The UI/design microservice of the integration service provider 1130 may include, for example, a metadata framework 1140 (e.g., with a metadata component registry 1144, a metadata parser 1146, and integration component metadata 1142 based on adapters, flow steps, script steps, etc.) that exchanges information with an automatic UI component/framework 1148.

The automatic UI component/framework 1148 and metadata framework 1140 also exchange information with a UI to configuration contract establisher 1150. The UI to configuration contract establisher 1150 may, in some embodiments, extract user configurations. Moreover, the automatic UI component/framework 1148 communicates with a configuration framework (e.g., for a multi-tenant microservice) 1160. A configuration injector 1180 in the configuration framework 1160 may match appropriate configurations for a component. A browse configuration component 1182 and a publish configuration component 1184 in the configuration framework 1160 may make the integration component available via a marketplace platform. A configuration registry 1170 may be associated with types for component configurations 1172 and iFlow configurations 1174.

According to some embodiments, a version management component 1192 may be responsible for versioning the configuration (e.g., a version number, change date, change author, etc.). A commercialize configuration 1194 of the configuration framework 1160 might, for example, be an existing service of the integration service where one can register a configuration to be published and/or commercialized (depending on the cloud-computing service providers goals). In this way, embodiments may provide a method and framework for lifecycle management and commercialization of a configuration. That is, a developer who creates a configuration can commercialize and publish it for other consumers and maintain the lifecycle using the configuration framework 1160.

Figure 12:
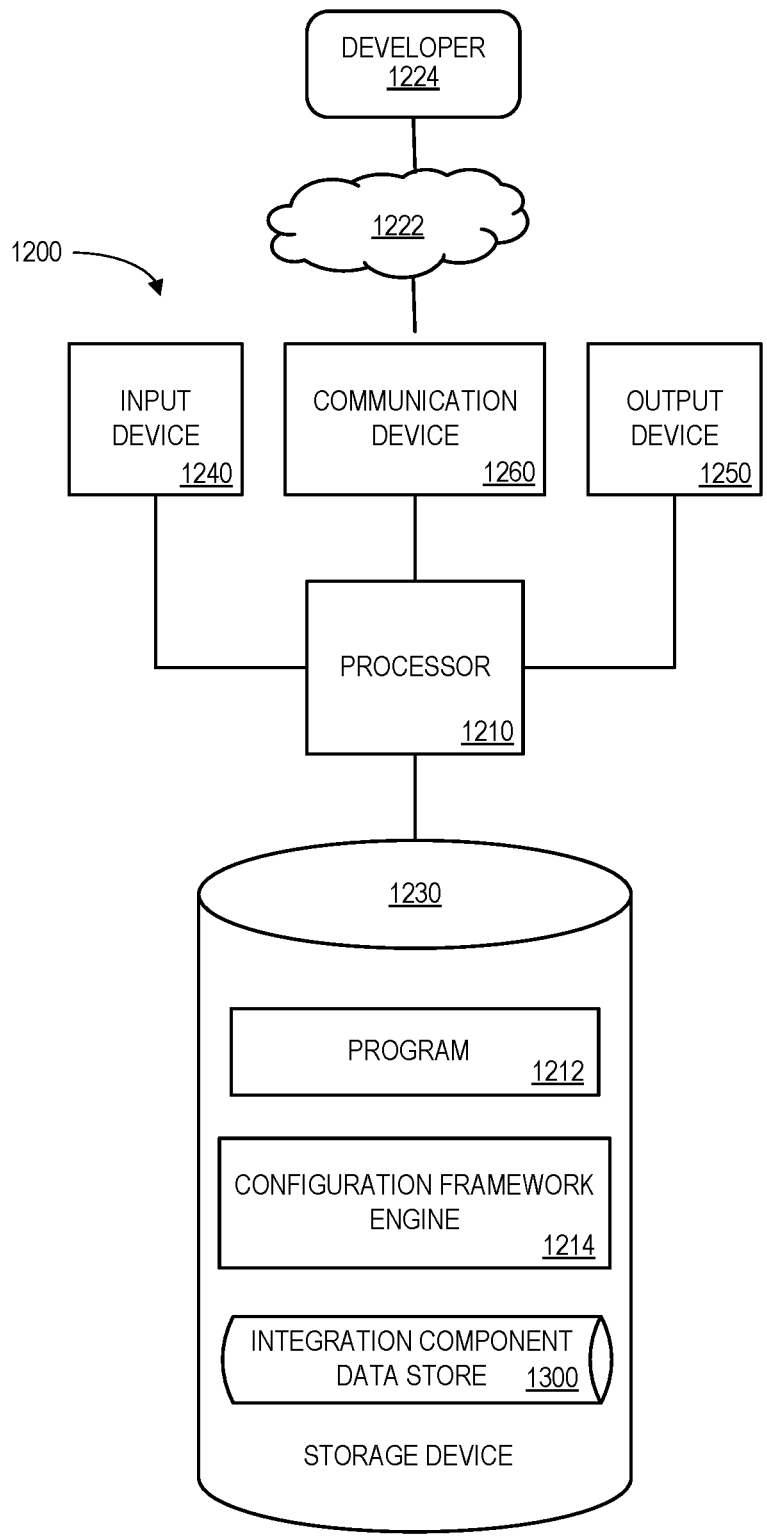
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the systems 300, 600, 900, and 1100 of FIGS. 3, 6, 9, and 11, respectively (and/or any other system described herein). The platform 1200 comprises a processor 1210, such as one or more commercially available Central Processing Units ("CPUs") in the form of one-chip microprocessors, coupled to a communication device 1260 configured to communicate via a communication network (not shown in FIG. 12). The communication device 1260 may be used to communicate, for example, with one or more developers 1224 (e.g., via a communication network 1222), UI/browsers, etc. The platform 1200 further includes an input device 1240 (e.g., a computer mouse and/or keyboard to input create and/or manage microservice information) and/an output device 1250 (e.g., a computer monitor to render a display, transmit recommendations, and/or create reports about integration services, integration components, tenants, users, etc.). According to some embodiments, a mobile device and/or PC may be used to exchange information with the platform 1200.

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or configuration framework engine 1214 for controlling the processor 1210. The processor 1210 performs instructions of the programs 1212, 1214, and thereby operates in accordance with any of the embodiments described herein. For example, the processor 1210 may provide an integration service (e.g., associated with a Software-as-a-Service or a Platform-as-a-Service) using a UI framework and UI components for a first integration developer. The processor 1210 may determine a set of configuration values for an integration component of an integration scenario defined by the first integration developer. The processor 1210 may then receive, from the first integration developer, a publication indication associated with the integration component. Responsive to the publication indication, the processor 1210 may arrange for the set of configuration values for the integration component to be made available to a second integration developer (e.g., via a marketplace platform).

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores an integration component data store 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Referring to FIG. 13, a table is shown that represents the integration component data store 1300 that may be stored at the platform 1200 according to some embodiments. The table may include, for example, entries identifying flow steps that have been created and/or customized for integration services associated with a cloud computing environment. The table may also define fields 1302, 1304, 1306, 1308, 1310 for each of the entries. The fields 1302, 1304, 1306, 1308, 1310 may, according to some embodiments, specify: an integration component identifier 1302, a tenant identifier 1304, configuration values 1306, price 1308, and a status 1310. The integration component data store 1300 may be created and updated, for example, when new integration components or scenarios are developed or changed, etc.

The integration component identifier 1302 might be a unique alphanumeric label that is associated with an integration component for which configuration values have been defined for an integration scenario. The tenant identifier 1304 might be associated with a developer who defined the configuration values. The configuration values 1306 define the integration component, and the price 1308 might represent a cost or other condition that must be met before the component can be used by other developers and/or tenants. The status 1310 might indicate, for example, that a component has been saved, is being edited, has been sold, is published in a marketplace, etc.

Thus, embodiments may provide re-usable integration component configurations for an integration service in a cloud computing environment in a secure, automatic, and efficient manner. Note that embodiments may reduce the manual re-modeling of integration components. Moreover, integration requirements are fairly standard when it comes to configuring an integration component. For example, to connect to a GOOGLE® drive or a SALESFORCE® system, almost all configuration values will be similar. Embodiments may help reduce re-modeling and thereby reduce the cost and the introduction of errors when defining integration scenarios. Because configurations are separately managed, the system may help ensure that the latest and highest quality components are available to users.

Embodiments may also facilitate a relatively lightweight runtime. Most providers offer different integration components that are specific to a backend. For example, there may be two separate adapters: one for SALESFORCE® and one for GOOGLE® drive. Such an approach can increase the runtime weight significantly (and also adds complex management for both the UI and runtime). If both the Google and the Salesforce API use the same HTTP client, there is no need to duplicate two HTTP clients (such that if a client version changes it must be done in two places). Instead, embodiments may simply re-use an integration service offered HTTP adapter with a two different configurations. In this way, an integration developer does not have to maintain the run-time code (keeping the runtime worker lightweight).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
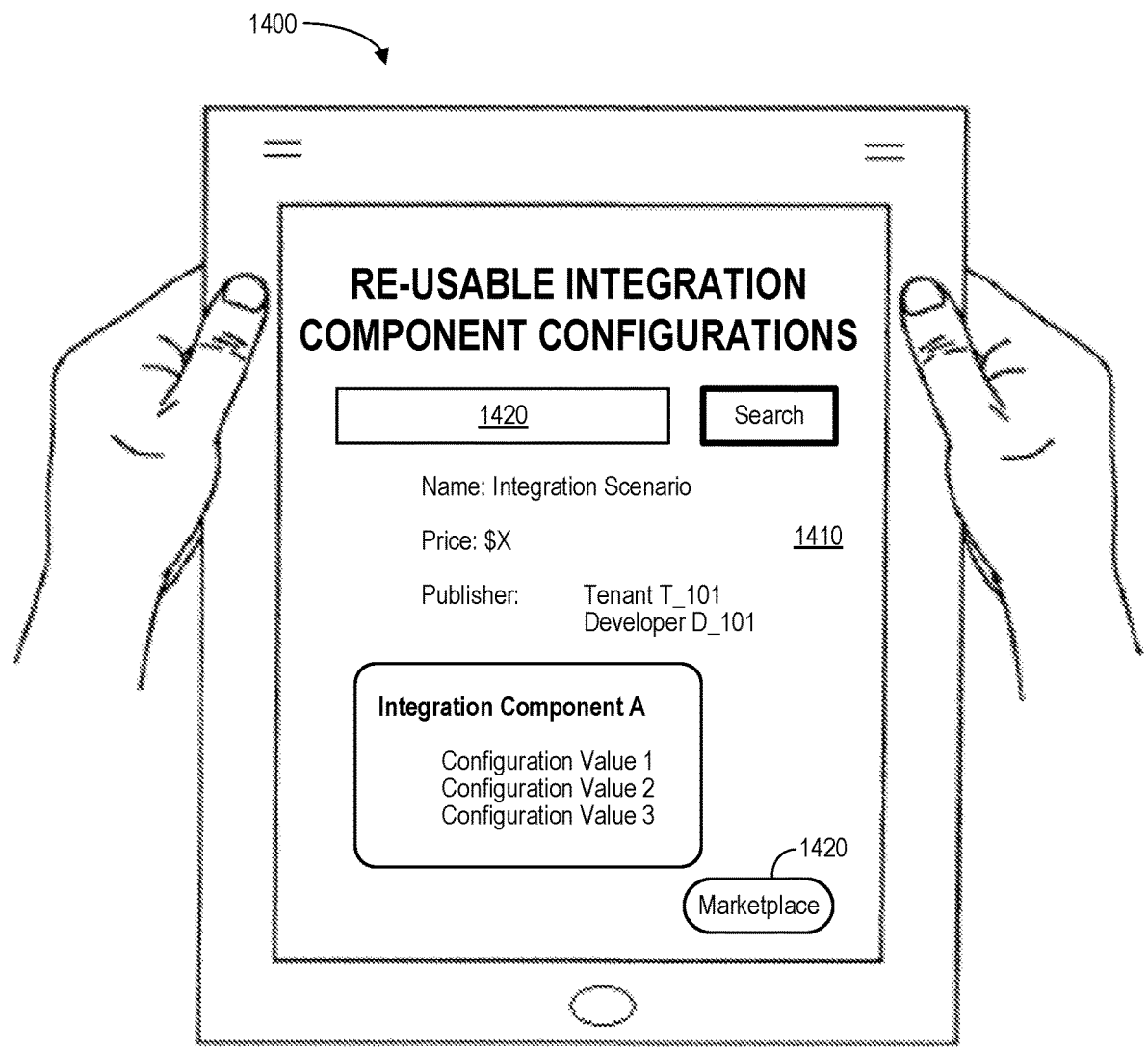
FIG. 14 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented. For example, FIG. 14 illustrates a tablet computer 1400 providing a re-usable integration component configurations display 1410. The display 1410 might be used, for example, to search 1420 for integration components and/or scenarios. Moreover, the display 1410 might be used to access via a "Marketplace" icon 1430 so that components can be easily and efficiently purchased and consumed by other users (e.g., associated with the same tenant or with other tenants).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing environment having an integration service, comprising:
- a design microservice having a User Interface ("UP") framework and UI components for a first integration developer associated with a first tenant, including:
  - a UI to configuration contract establisher to extract user configurations; and
- a configuration framework associated with a multi-tenant microservice, including:
  - a version management component to provide lifecycle management,
  - a computer processor, and
  - a computer memory storing instructions that when executed by the computer processor cause the configuration framework to:
    - receive, from the UI to configuration contract establisher, a set of configuration values for integration components of an integration scenario, the integration scenario including adapter and custom script integration components, defined by the first integration developer, receive, from the first integration developer, a publication indication associated with the integration components, and responsive to the publication indication, arrange for the set of configuration values for the integration components to be made available to a second integration developer associated with a second tenant.

2. The system of claim 1, wherein the integration scenario further includes flow step and mapping step components.

3. The system of claim 1, wherein at least one configuration value from the set of the configuration values is associated with at least one of: (i) an authentication type, (ii) a query, (iii) a retry configuration, (iv) a time-out, (v) a big query string, (vi) a page initiation configuration, (vii) a security configuration, and (viii) a schedule.

4. The system of claim 1, wherein said arranging for the set of configuration values for the integration components to be made available to the second integration developer is associated with an open Application Programming Interface ("API") specification.

5. The system of claim 4, wherein said arranging for the set of configuration values for the integration components to be made available to the second integration developer is associated with JavaScript Object Notation ("JSON").

6. The system of claim 1, wherein sets of configuration values for a plurality of integration scenarios are made available to the second integration developer.

7. The system of claim 1, wherein the configuration framework further includes:
a configuration registry associated with types for at least one of: (i) a component configuration, and (ii) an iFlow configuration.

8. The system of claim 1, wherein the configuration framework further includes:
a configuration injector to match an appropriate configuration for the integration components.

9. The system of claim 1, wherein the configuration framework further includes:
a browse configuration component and a publish configuration component to make the integration component available via a marketplace platform.

10. The system of claim 1, wherein the configuration framework further includes:
a commercialization component to provide commercialization of the integration components.

11. The system of claim 1, wherein the integration service is associated with at least one of: (i) a Software-as-a-Service, and (ii) a Platform-as-a-Service.

12. A non-transitory, computer-readable medium having executable instructions stored therein, the medium comprising:
instructions to receive from a User Interface ("UI") to configuration contract establisher, by a computer processor of a configuration framework associated with a multi-tenant microservice, a set of extracted configuration values for integration components of an integration scenario, the integration scenario including adapter and custom script integration components, defined by a first integration developer associated with a first tenant via a design microservice having a UI framework and UI components, including the UI to configuration contract establisher and a version management component to provide lifecycle management;
instructions to receive, from the first integration developer, a publication indication associated with the integration components; and responsive to the publication indication, instructions to arrange for the set of extracted configuration values for the integration components to be made available to a second integration developer associated with a second tenant.

13. The medium of claim 12, wherein the integration scenario further includes flow step and mapping step components.

14. The medium of claim 12, wherein at least one configuration value from the set of the extracted configuration values is associated with at least one of: (i) an authentication type, (ii) a query, (iii) a retry configuration, (iv) a time-out, (v) a big query string, (vi) a page initiation configuration, (vii) a security configuration, and (viii) a schedule.

15. A computer-implemented method associated with a cloud computing environment having an integration service, comprising:
receiving from a User Interface ("UI") to configuration contract establisher, by a computer processor of a configuration framework associated with a multi-tenant microservice, a set of extracted configuration values for integration components of an integration scenario, the integration scenario including adapter and custom script integration components, defined by a first integration developer associated with a first tenant via a design microservice having a UI framework and UI components, including the UI to configuration contract establisher and a version management component to provide lifecycle management;
receiving, from the first integration developer, a publication indication associated with the integration components; and
responsive to the publication indication, arranging for the set of extracted configuration values for the integration components to be made available to a second integration developer associated with a second tenant.

16. The method of claim 15, wherein said arranging for the set of extracted configuration values for the integration components to be made available to the second integration developer is associated with an open Application Programming Interface ("API") specification.

17. The method of claim 16, wherein said arranging for the set of extracted configuration values for the integration components to be made available to the second integration developer is associated with JavaScript Object Notation ("JSON").

18. The method of claim 15, wherein sets of configuration values for a plurality of integration scenarios are made available to the second integration developer.

* * * * *